No. 685,636. Patented Oct. 29, 1901.
B. G. PASCHALL.
CULTIVATOR.
(Application filed Oct. 5, 1901.)

(No Model.)

Witnesses
Geo. E. Frech.
Chas. R. Wright Jr.

Inventor
B. G. Paschall,
By A. S. Pattison,
Attorney

THE NORRIS PETERS CO., PHOTO-LITHO., WASHINGTON, D. C.

UNITED STATES PATENT OFFICE.

BENJAMIN G. PASCHALL, OF BLACKCREEK, NORTH CAROLINA, ASSIGNOR OF ONE-HALF TO SAMUEL S. EARLE, OF BLACKCREEK, NORTH CAROLINA.

CULTIVATOR.

SPECIFICATION forming part of Letters Patent No. 685,636, dated October 29, 1901.

Application filed October 5, 1901. Serial No. 77,675. (No model.)

*To all whom it may concern:*

Be it known that I, BENJAMIN G. PASCHALL, a citizen of the United States, residing at Blackcreek, in the county of Wilson and State of North Carolina, have invented new and useful Improvements in Cultivators, of which the following is a specification.

My invention relates to improvements in cultivators, all of which will be fully described hereinafter.

The object of my invention is to provide a cultivator adapted to be run in either direction by reversing the draft-beam and adjusting the teeth or plow-standards half-way around, whereby the teeth or plows will either throw the soil up to the plants or throw it away from the plants, thus cultivating both sides of the rows each time it passes across the field, which is a great saving in time and labor over a cultivator which cultivates one side only of the row.

Figure 1:
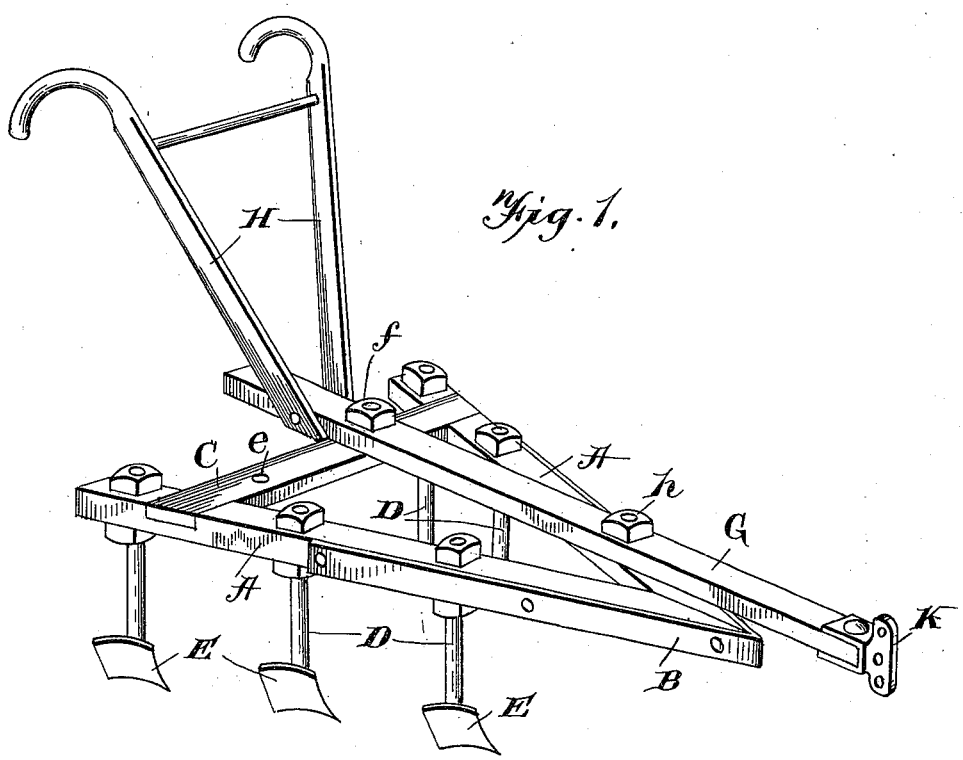
Figure 2:
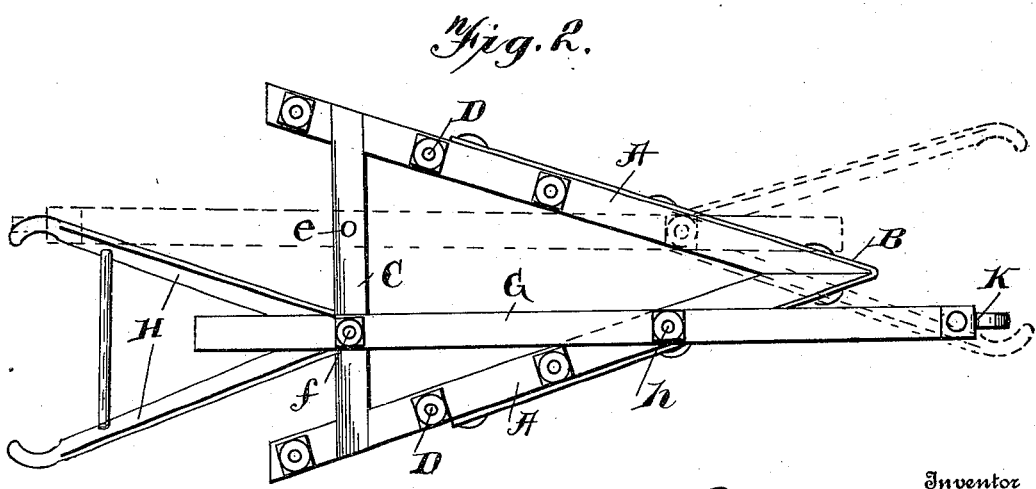

In the accompanying drawings, Figure 1 is a perspective view of my device, showing the beam and plows in position for drawing the cultivator in one direction and throwing the dirt away from the plants. Fig. 2 is a top plan view showing the draft-beam in solid lines in a position corresponding to Fig. 1 and in a reversed position in dotted lines.

Referring now to the drawings, A represents a V-shaped cultivator-frame, having its forward ends securely connected and their opposite ends connected through the medium of a cross-bar C. The side bars B of the said frame are provided with a plurality of vertical openings in which the plow or teeth standards D are adjustably connected through the means of nuts above and below said side bars. Bolt-openings *e* are formed in the said cross-bar C at each side of the center thereof, as shown. A draft-beam G is provided, which carries at one end a clevis K and at its opposite end the handles H. This beam is detachably and reversibly connected with the frame A through the medium of a bolt *f*, which passes through the handle end of the beam and the cross-bar C. The opposite end is attached through the medium of the forward standard D. When the draft-beam is reversed, as shown in dotted lines, Fig. 2, the standard serves to connect the beam to the apex end of the frame and the bolt *f* to connect the clevis end to the cross-bar C. The openings in the beam are a distance apart corresponding to the distance between the openings in the cross-bar C and the opposite ends of the side bars of the frame.

When the cultivator is used for throwing the soil away from the row over which it is passing, the beam and teeth or plows are in the position shown in Fig. 1, with the horse to the left of the row. When, however, the cultivator is used for throwing the soil toward the plants, the draft-beam G is reversed, as shown in dotted lines, Fig. 2, and the standards adjusted half-way around, which will cause the plows to be in a reversed position in respect to the plants and the horse on the left-hand side of the row being cultivated. The cultivator, as will be noted, cultivates both sides of the row at the same time and is of the straddle-row type.

Having thus described my invention, what I claim, and desire to secure by Letters Patent, is—

1. A straddle-row cultivator comprising a rigid V-shaped frame having openings adjacent its converging end, horizontally-adjustable plows carried by the diverging ends of the said frame, whereby the plows can be turned around, a bar connecting said diverging end and having openings therein, a reversible draft-beam having openings to register with the openings in the frame and cross-bar, handles carried by one end of said beam and a clevis carried by the opposite end of said beam, and clamping-bolts for said beam, whereby the draft-beam can be reversed and the plows turned around, substantially as described.

2. A cultivator comprising a V-shaped rigid frame having openings on either side of the apex thereof, a bar connecting the rear end of the V-shaped frame and having an opening on either side of its center, a draft-beam having handles at one end and a clevis at the other end and having openings corresponding with the openings in the V-shaped frame and cross-bar, whereby the beam can be secured on either side of the center of the said V-shaped frame, substantially as described.

In testimony whereof I have hereunto set my hand in the presence of two subscribing witnesses.

BENJAMIN G. PASCHALL.

Witnesses:
W. D. P. SHARP,
W. M. WELLS.